May 19, 1931. J. H. OWENS 1,806,176
PIPE REST
Filed June 27, 1927 2 Sheets-Sheet 1

Inventor
John H. Owens
By Young & Young
Attorneys

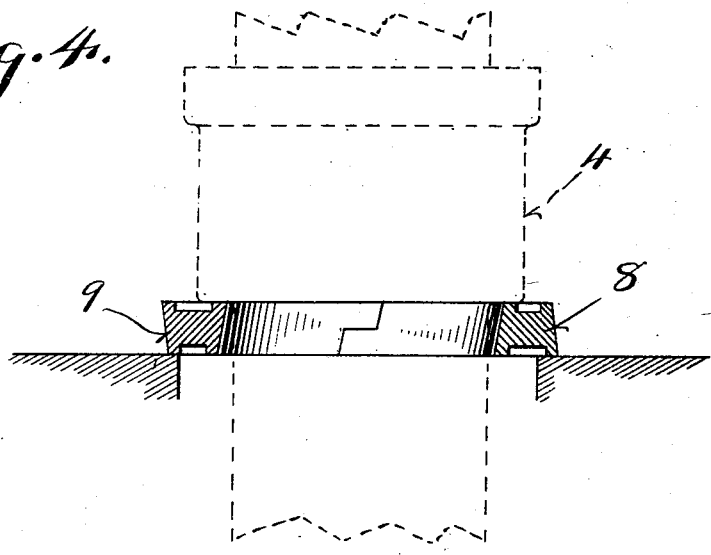
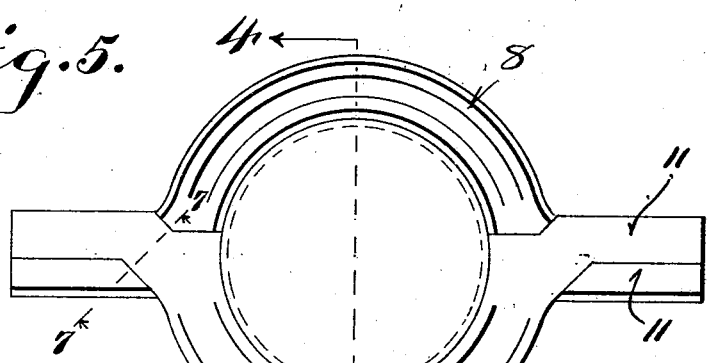
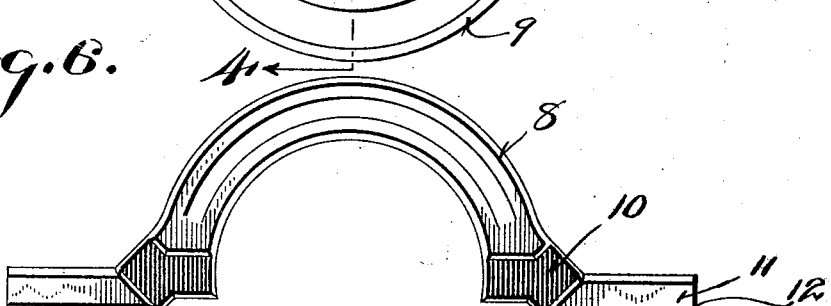

Patented May 19, 1931

1,806,176

UNITED STATES PATENT OFFICE

JOHN H. OWENS, OF RACINE, WISCONSIN

PIPE REST

Application filed June 27, 1927. Serial No. 201,627.

This invention relates to pipe rests.

Objects of this invention are to provide a novel form of pipe rest which may be quickly assembled to enclose a pipe and which is so constructed that it has interlocking projecting supporting ends adapted to rest upon a support and to be held against inadvertent detachment by the weight of the pipe without the use of any auxiliary fastening means.

Further objects are to provide a very simple and easily produced pipe rest which may be cheaply made and which may be handled and used with the utmost facility.

Embodiments of the invention are shown in the accompanying drawings in which:

Figure 4 is a sectional view of a modified form of pipe rest, such section being taken on the line 4—4 of Figure 5;

Figure 5 is a plan view of the structure shown in Figure 4;

Figure 6 is a view of one member of the pipe rest as shown in Figures 4 and 5;

Figure 7 is a sectional view on the line 7—7 of Figure 5.

Figure 1:
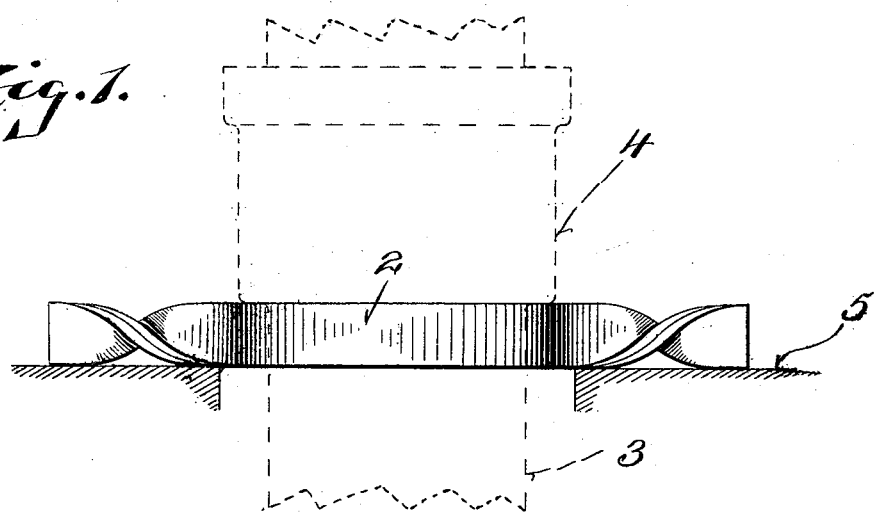
Figure 1 is a side elevation of one form of the invention showing in dotted lines the position of the pipe.
Figure 2:
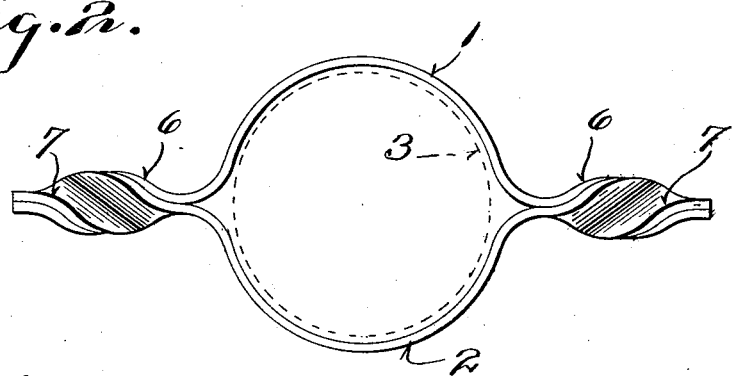
Figure 2 is a plan view of the structure shown in Figure 1.
Figure 3:
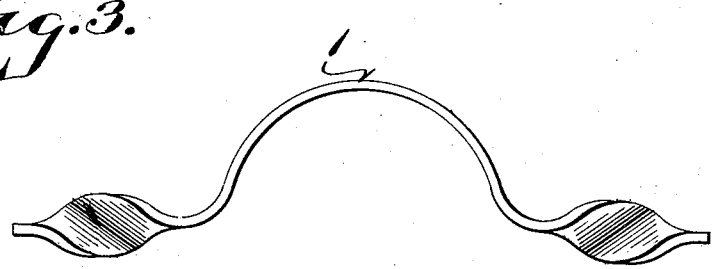
Figure 3 is a view of one of the members of the pipe rest shown in Figures 1 and 2.

Referring to the form of the invention shown in Figures 1 to 3 inclusive, it will be seen that the pipe rest comprises a pair of body portions 1 and 2 which are of semi-circular contour and are adapted to enclose a pipe, as indicated in dotted lines by the reference character 3. This pipe rest is adapted for positioning immediately below the enlarged head 4 of the pipe. These semi-circular body portions wholly surround the pipe and are provided with twisted ends adapted to rest upon a suitable support 5, as shown in Figure 1. The twisted ends of the body portion 1 are indicated by the reference character 6, and the twisted ends of the body portion 2 are represented by the reference character 7. It will be seen that the ends 6 are so twisted as to provide an upwardly opening depression adapted to receive in an interlocking manner the downwardly projecting portion resulting from the twisting of the ends 7, as shown most clearly in Figure 2. In this manner, it will be seen that the interlocking parts are arranged at an angle to the ends and consequently hold such ends against lateral separation. The weight of the pipe transmitted to the support by means of the enlarged portion or head 4 precludes separation of the members and holds them rigidly and firmly interlocked without the use of auxiliary fasteners.

It is to be noted further that the members composing the pipe rest are formed of strap metal and are very readily bent to shape to provide the semi-circular body portions and the interfitting ends.

Referring to the form of the invention shown in Figures 4 to 7, inclusive, it will be seen that this form of pipe rest is preferably cast or otherwise shaped to provide semi-circular body portions 8 and 9, which are preferably channeled and ribbed, as indicated in Figures 4, 5, and 6. These body portions surround the pipe 3 below the enlarged portion 4, as previously described. They are of similar construction and are each provided with a depressed or recessed portion 10. These recessed portions come together one above the other in the assembled condition, as shown in Figure 5. The ends continue outwardly to provide projecting supporting portions 11. Preferably, the contacting faces of the members are bevelled, as indicated at 12, and, if desired, a slight bevel or slant may be formed at the recessed portions. It is to be noted that the projecting ends interlock in a manner similar to that previously described in connection with the first form of the invention. The construction last described may be very readily produced and, it will be seen, provides a very secure support for the pipe.

In using the device, it is a very simple matter to assemble the members, as indicated in the drawings and described above, and thereafter allow the weight of the pipe to be borne by the pipe rest, thus holding the members in interlocking engagement.

It will be seen further that the pipe rest is of extremely simple construction and may be very cheaply produced and readily handled.

Although the invention has been described in considerable detail, such description is intended as illustrative rather than limiting as the invention may be variously embodied and as the scope of such invention is to be determined as claimed.

I claim:

1. A pipe rest comprising two members formed of strap metal and having semi-circular body portions and projecting twisted detachably interlocking ends.

2. A pipe rest comprising two members formed of strap metal and each having a semi-circular body portion and projecting twisted ends with the ends of one member adapted to be removably seated in detachable interlocking relation with the ends of the other member.

In testimony that I claim the foregoing I have hereunto set my hand at Racine, in the county of Racine and State of Wisconsin.

JOHN H. OWENS.